US011165910B2

(12) United States Patent
Synal et al.

(10) Patent No.: US 11,165,910 B2
(45) Date of Patent: Nov. 2, 2021

(54) AUTOMATED UNAVAILABILITY RESPONSE FOR CALL HANDLING

(71) Applicant: T-Mobile USA, Inc., Bellevue, WA (US)

(72) Inventors: Adrian Synal, Kirkland, WA (US); Michele Kinsey, Shoreline, WA (US); Vinod Ravichandran, Renton, WA (US); Chingming Chao, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 27 days.

(21) Appl. No.: 16/224,524

(22) Filed: Dec. 18, 2018

(65) Prior Publication Data

US 2019/0379792 A1   Dec. 12, 2019

Related U.S. Application Data

(60) Provisional application No. 62/683,477, filed on Jun. 11, 2018.

(51) Int. Cl.
| | |
|---|---|
| *G06F 15/16* | (2006.01) |
| *H04M 3/533* | (2006.01) |
| *H04L 12/58* | (2006.01) |
| *H04W 4/14* | (2009.01) |

(52) U.S. Cl.
CPC ........ *H04M 3/53391* (2013.01); *H04L 51/02* (2013.01); *H04L 51/066* (2013.01); *H04L 51/10* (2013.01); *H04L 51/14* (2013.01); *H04L 51/22* (2013.01); *H04L 51/38* (2013.01); *H04M 3/53341* (2013.01); *H04W 4/14* (2013.01)

(58) Field of Classification Search
CPC .......... H04M 3/53391; H04M 3/53341; H04L 51/02; H04L 51/066; H04L 51/14; H04L 51/38; H04L 51/22; H04L 51/10; H04W 4/14

See application file for complete search history.

(56) References Cited

U.S. PATENT DOCUMENTS

| | | | | |
|---|---|---|---|---|
| 4,996,704 A | * | 2/1991 | Brunson ............... | H04M 3/533 379/100.08 |
| 5,467,388 A | * | 11/1995 | Redd, Jr. .............. | H04M 1/663 379/210.02 |
| 8,509,395 B1 | * | 8/2013 | Crawford .......... | H04M 3/53383 379/76 |
| 2003/0134626 A1 | * | 7/2003 | Himmel ................. | H04M 3/38 455/419 |

(Continued)

*Primary Examiner* — Padma Mundur
(74) *Attorney, Agent, or Firm* — Han Santos, PLLC (57) ABSTRACT

Automated unavailability response for call handling is used to notify an incoming caller that a subscriber is unavailable to answer the incoming call. An incoming call that is initiated from an originating caller device is received at a network server for routing to a terminating user device of a specific subscriber. A user profile of the specific subscriber that includes one or more unavailability notification settings for the incoming call is retrieved from a user profile database. An unavailability notification message is selected from a data store based at least on the one or more unavailable notification settings. The unavailability notification message is sent from the network server to the originating caller device.

20 Claims, 6 Drawing Sheets

(56) References Cited

U.S. PATENT DOCUMENTS

| | | | | |
|---|---|---|---|---|
| 2005/0195954 A1* | 9/2005 | Klein | ................ | H04M 3/42374 |
| | | | | 379/201.04 |
| 2006/0198509 A1* | 9/2006 | Karnalkar | ............ | H04Q 3/0029 |
| | | | | 379/239 |
| 2007/0121914 A1* | 5/2007 | Pearson | ................ | H04M 1/665 |
| | | | | 379/355.07 |
| 2008/0317223 A1* | 12/2008 | Koch | ................ | H04M 3/53366 |
| | | | | 379/88.21 |
| 2012/0178424 A1* | 7/2012 | Wood | ................ | H04M 1/72433 |
| | | | | 455/413 |
| 2012/0309361 A1* | 12/2012 | Corbett | ............ | H04M 3/42348 |
| | | | | 455/413 |
| 2014/0118465 A1* | 5/2014 | Scott | .................... | H04M 3/436 |
| | | | | 348/14.03 |
| 2015/0189090 A1* | 7/2015 | Regan | ................ | H04M 3/5315 |
| | | | | 455/413 |

\* cited by examiner

AUTOMATED UNAVAILABILITY RESPONSE FOR CALL HANDLING

CROSS-REFERENCE TO RELATED PATENT APPLICATION

This application claims priority to U.S. Provisional Patent Application No. 62/683,477, filed on Jun. 11, 2018, entitled "Automated Unavailability Response for Call Handling," which is hereby incorporated by reference in its entirety.

BACKGROUND

Some users may not modify their voicemail greetings to let callers know that they are on vacation or otherwise unavailable to receive calls for extended periods of time, such as multiple days or multiple weeks. Further, even when users update their voicemail greetings to indicate that they are unavailable for extended periods of time, there is no guarantee that callers will listen to those updated voicemail greetings. This is because callers are prone to hang up as soon as they realize they are hearing voicemail greetings. For example, it has been estimated that 80% of callers will hang up upon hearing a voicemail greeting instead of a live person answering the phone. Hence, updated voicemail greetings that indicate users are unavailable for extended periods of time are often unheard by callers.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable a subscriber of a wireless carrier network to set up automatic unavailability notification messages to be automatically sent to telephone numbers of callers. The telephone numbers are also referred to as Mobile Station International Subscriber Directory Numbers (MSISDNs). The subscriber may set up the notification message when the subscriber intends to be unavailable to receive telecommunication calls for an extended period of time, such as multiple days or multiple weeks. The notification message may be in a short message service (SMS) message format, a multimedia messaging service (MMS) message format, a rich communication service (RCS) message format, or other message formats.

In various embodiments, the wireless carrier network may provide a configuration interface that permits the subscriber to indicate that a voicemail greeting is being set up for an extended unavailability. The subscriber may access the configuration interface via a user device of the subscriber, such as a smartphone. For example, the configuration interface may be a web portal interface, a client application interface, and/or so forth. The configuration interface may enable the subscriber to input an unavailability notification message that can be automatically delivered to the telephone number of a caller. The unavailability notification message may be stored in a data store of the wireless carrier network. Further, the configuration interface may enable the subscriber to create different types of unavailability notification messages having different message content for different groups of callers. Additionally, the configuration interface may enable the subscriber to customize the notification settings under which the unavailability notification messages may be sent. For example, the notification settings may determine whether or not an unavailability notification message is to be sent to a caller in combination with performing one or more other call handling tasks. The notification settings may be customized for a group of callers or individual callers in a group. The notification settings may be stored in a user profile database of the wireless carrier network.

Thus, when a telephony application server (TAS) of the wireless carrier network receives an incoming call request from an originating caller device, the TAS may use the information stored in the user profile database to select an appropriate unavailability notification message and send the message to the originating caller device.

The use of automatic unavailability notification may enable a subscriber of a wireless carrier network to set up the delivery of unavailability notification messages in a centralized manner at a network server, instead of on a device-by-device basis. Further, the unavailability notification messages may inform the callers of the long-term unavailability of the subscriber even when callers do not listen or pay attention to the voicemail greeting of the subscriber that makes the same notification. Such messages may prevent repeated callbacks by callers when the subscriber does not intend to answer calls for an extended period of time. This may reduce the total amount of call volume experienced by a wireless carrier network and decrease the use of network and communication resources. The techniques described herein may be implemented in a number of ways. Example implementations are provided below with reference to the following figures.

Example Network Architecture

Figure 1:
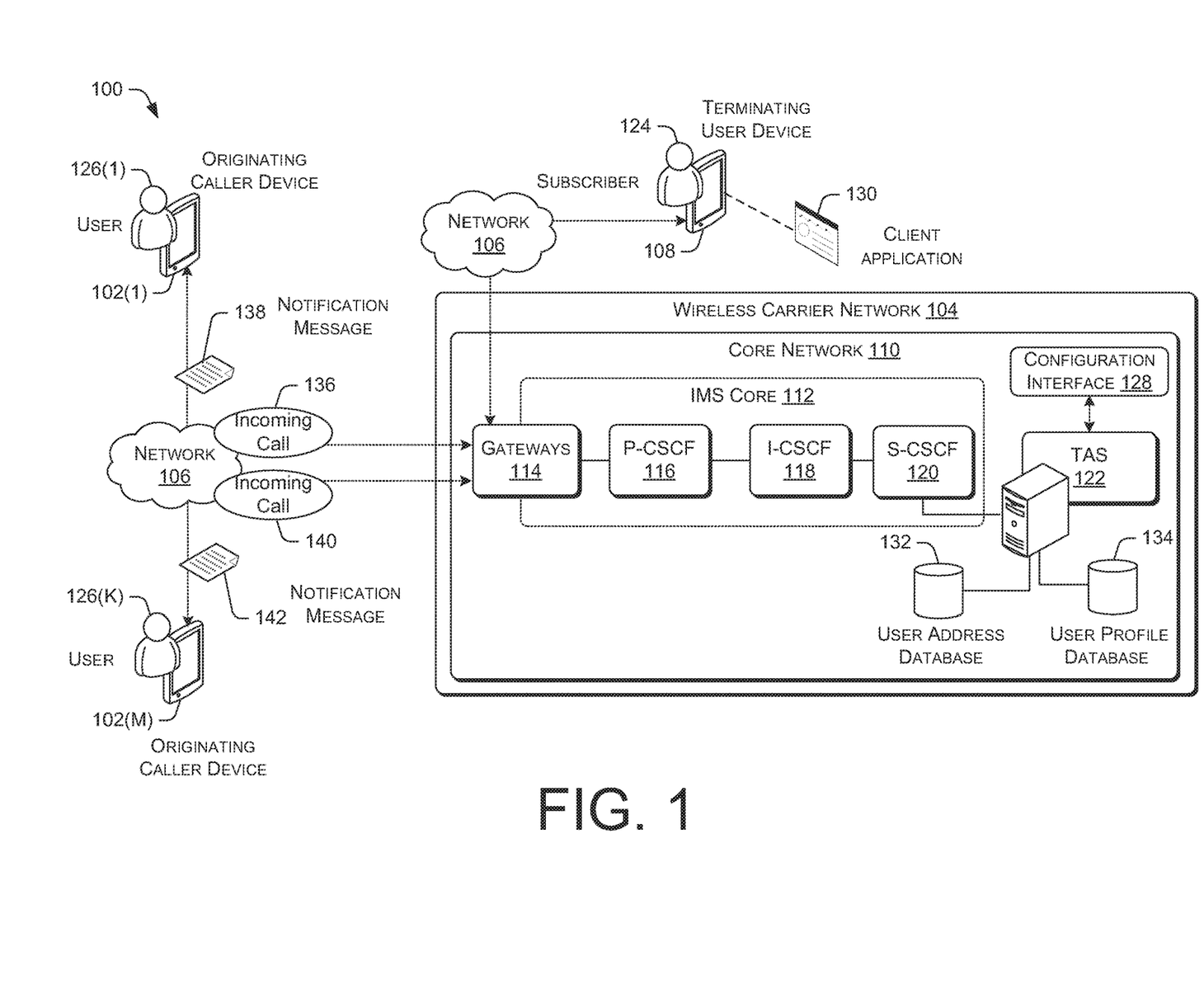
FIG. 1 illustrates an example network architecture for implementing automated unavailability response for call handling.

FIG. 1 illustrates an example network architecture 100 for implementing automated unavailability response for call handling. The network architecture 100 may include originating caller devices 102(1)-102(M), a wireless carrier network 104, and a terminating user device 108. Each of the originating caller devices and the terminating user device 108 may be a smartphone, a smartwatch, a tablet computer, a phablet computer, or any other computing device that is capable of communicating with other devices via the wireless carrier network 104. The wireless carrier network 104 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), $5^{th}$ Generation (5G) wireless systems, CDMA-2000 (Code Division Multiple Access 2000), and/or so forth.

The wireless carrier network 104 may include a radio access network and a core network 110. The radio access network may include multiple base stations. The multiple base stations are responsible for handling voice and data traffic between multiple user devices, such as the originating caller device 102(1), and the core network 110. Accordingly, each of the base stations may provide a corresponding network cell that delivers telecommunication and data communication coverage. The core network 110 may use the network cells to provide communication services to the multiple user devices.

In various embodiments, the core network 110 of the wireless carrier network 104 may include an IP Multimedia Subsystem (IMS) core 112. The IMS core 112 may be accessed via one or more gateways 114 and related components that are tasked with providing connectivity between the wireless carrier network 104 and the user devices by acting as a point of entry and exit for data traffic. In turn, the IMS core 112 may provide the user devices with data access to external packet data networks, such as the networks of other wireless carrier networks. The IMS core 112 may include a Proxy Call Session Control Function (P-CSCF) 116 or an equivalent function. The P-CSCF 116 may route incoming Session Initiation Protocol (SIP) messages to an IMS registrar server. The P-CSCF 116 may also safeguard the security of the IMS core by handling Internet Protocol Security (IPSec) for communications that are exchanged with user devices. In some alternative instances, instead of SIP sessions, the P-CSCF 116 may handle Remote Authentication Dial-In User Service (RADIUS) sessions. The P-CSCF 116 may interact with an Interrogating CSCF (I-CSCF) 118, and a Serving CSCF (S-CSCF) 120. In some instances, the I-CSCF 118 may be an inbound SIP proxy server of the IMS core 112. During IMS registration of a user device, the I-CSCF 118 may query a home subscriber server (HSS) to designate an S-CSCF to service the user device. The I-CSCF 118 may be further responsible for routing incoming IMS session requests and terminating IMS sessions requests.

The S-CSCF 120 may communicate with a telephony application server (TAS) 122 that resides in the core network 110. The TAS 122 may route voice and/or data communications within the wireless carrier network 104 and with other networks, including public switch telephone networks (PSTNs). The TAS 122 may further perform tasks such as incoming call alerting, call forwarding, caller ID service, voicemail access and routing, call blocking, etc. For example, the TAS 122 may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The terminating user device 108 may be used by a subscriber 124 of the wireless carrier network 104 to receive telecommunication services from the network. The telecommunication services may include voice calling services, messaging services, web access services, and/or so forth. For example, the terminating user device 108 may be used by the subscriber 124 to receive incoming calls that are initiated at the originating caller device 102(1) by a caller 126(1) or at the originating caller device 102(2) by a caller 126(2). The incoming calls that are initiated may be voice calls, multimedia calls, or other types of calls. The core network 110 may further include a billing function, such as a Policy and Charging Rules Function (PCRF) or another equivalent billing function. The billing function may enable the wireless carrier network to monitor the services, such as data, voice, text, etc., that are used by each subscriber, and charge the subscribers and/or other parties in real-time based on service usage. In various embodiments, the billing function may be an Online Charging System (OCS) or another equivalent core network component of the wireless carrier network 104.

In some embodiments, the TAS 122 may provide a configuration interface 128 that enables a subscriber to set up the delivery of automatic unavailability notifications to originating caller devices in response to receiving incoming calls from the originating caller devices. The subscriber 124 may access the configuration interface 128 via a user device of the subscriber, such as the terminating user device 108 or some other device. For example, the configuration interface 128 may be a web portal interface, a client application interface, and/or so forth. The client application interface may be provided by a client application 130 on the user device, such as an over-the-top (OTT) application, an original equipment manufacturer (OEM) application that is built into the operating system (OS) of the user device, a WebRTC client application, or another client application executing on the user device. In some embodiments, the client application may be a video calling application, a Wi-Fi calling application, a Voice over LTE (VoLTE) application, and/or so forth. The video calling application may provide packet data-based video telephony that enables voice and video telecommunication over the wireless carrier network. The Wi-Fi calling application may provide Voice over wireless LAN (VoWLAN) calling by using an available wireless broadband network implemented according to IEEE 802.11 standards to carry voice and/or video communication. The VoLTE application may use an IP Multimedia Subsystem (IMS) core of a wireless carrier network to provide Internet Protocol (IP) data packet-based voice communication services to the user device.

The configuration interface 128 may enable the subscriber to input an unavailability notification message that can be automatically delivered to the telephone number of a caller, such as a telephone number of the originating caller device 102(1) or the originating caller device 102(M). In various embodiments, the configuration interface may enable the subscriber 124 to group telephone numbers of callers into different groups and create different types of unavailability notification messages having different message content for different groups of callers. The groups of telephone numbers may be stored in an address book maintained by the TAS 122 for the subscriber 124. In some embodiments, the address book may be a personal address book specific to the subscriber 124. Accordingly, multiple personal address books of multiple subscribers may be stored in a user address database 132 that is accessible to the TAS 122. In other embodiments, the address book maintained by the TAS 122 for the subscriber may be a corporate address book that is shared by the subscriber 124 and other subscribers who are employees of a company. For example, the address book may be an internal corporate directory of the company to which multiple subscribers have access. Further, the individual unavailability notification messages may be stored in a message data store accessible to the TAS 122.

The configuration interface 128 may further enable the subscriber to customize the unavailability notification settings under which the unavailability notification messages may be sent. The unavailability notification settings may include the time and date range during which an unavailability notification messages may be delivered in response to an incoming call. In some instances, the notification settings may determine whether or not an unavailability notification message is to be sent to a caller in combination with performing one or more other call handling tasks. Such tasks may include incoming call alerting, call forwarding, providing voicemail access, and/or so forth. Performing incoming call alerting means that the terminating user device 108 of the subscriber 124 is alerted to an incoming call. Call forwarding means that the incoming call is forwarded to an alternative telephone number. Providing voicemail access means that the incoming call is directed to a voicemail inbox of the subscriber by an automated voicemail messaging function of the TAS 122. The notification setting of the subscriber 124 may be stored by the TAS 122 in a user profile database 134. In some instances, the user profile database 134 may be maintained by the HSS, or an equivalent home location register (HLR) of the core network 110.

In some instances, an incoming call 136 may be initiated by the originating caller device 102(1) of the caller 126(1). The incoming call 136 may be routed to the wireless carrier network 104 via a network 106. In various embodiments, the network 106 may be a third-party wireless carrier network, a radio access network of the wireless carrier network 104, a local area network (LAN), a wide area network (WAN), a collection of networks (e.g., the Internet), and/or a combination that includes one or more of these networks. For example, a LAN may be a network that is established using Wi-Fi or Bluetooth standards and hardware. In turn, the core network 110 of the wireless carrier network 104 may route the incoming call 136 to the TAS 122. Accordingly, the TAS 122 may use the information stored in the user profile database 134 and/or the user address database 132 to select an appropriate unavailability notification message 138 to send to the originating caller device 102(1). Subsequently, the TAS 122 may send the appropriate unavailability notification message to the originating caller device via the network 106 and/or one or more other networks that are routing telecommunication services for the originating caller device 102(1). Likewise, an incoming call 140 may be initiated by the originating caller device 102(M) of the caller 126(K). The incoming call 140 may be routed by the network 106 to the TAS 122 in the core network 110. Thus, the TAS 122 may use the information stored in the user profile database 134 and/or the user address database 132 to select an appropriate unavailability notification message 142 to send to the originating caller device 102(1).

Example TAS Components

Figure 2:
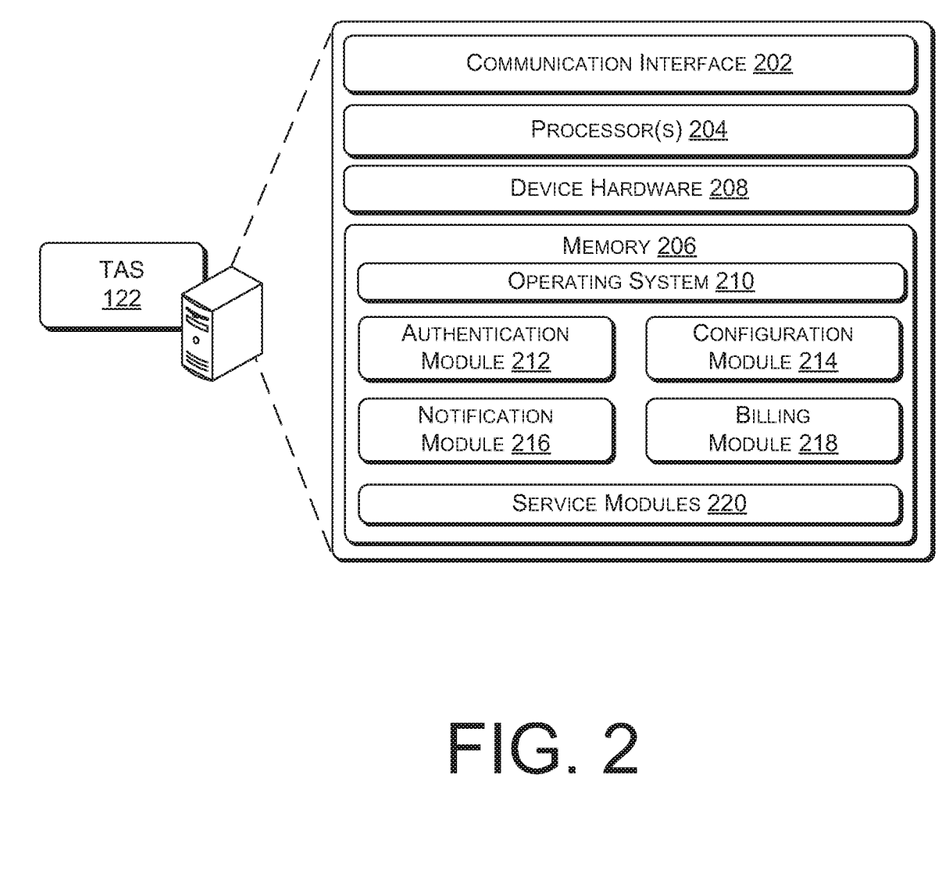
FIG. 2 is a block diagram showing various components of a telephony application server (TAS) that support automated unavailability response for call handling.

FIG. 2 is a block diagram showing various components of a TAS 122 that support automated unavailability response for call handling. The TAS 122 may include a communication interface 202, one or more processors 204, memory 206, and hardware 208. The communication interface 202 may include wireless and/or wired communication components that enable the TAS 122 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the TAS 122 or components thereof may be implemented using virtual computing devices in the form of virtual machines or software containers that are hosted in a computing cloud.

The processors 204 and the memory 206 of the TAS 122 may implement an operating system 210. The operating system 210 may include components that enable the TAS 122 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The processors 204 and the memory 206 of the TAS 122 may further implement an authentication module 212, a configuration module 214, a notification module 216, and a billing module 218. Further, the TAS 122 may include other service modules 220 that perform telecommunication service tasks for the wireless carrier network 104. The modules may include routines, code segments, program instructions, objects, and/or data structures that are executable by the processors 204 to perform particular tasks or implement particular abstract data types.

The authentication module 212 may use user authentication information to grant or deny subscribers access to the configuration interface 128. The user authentication information of a subscriber may include a subscriber access identifier, an authentication credential, etc. that the subscriber registered with the wireless carrier network 104 to obtain telecommunication services from the wireless carrier network 104. The user authentication information of a subscriber may be stored by the wireless carrier network 104 in a network subscriber database following registration. The authentication credential may be a password, biometric data, or some other user secret. In various embodiments, a subscriber that desires to access the configuration interface 128 may submit user authentication information (e.g., subscriber access identifier, password) to the authentication module 212. In turn, the authentication module 212 may authenticate the subscriber by validating the user authentication information to the stored user authentication information in the network sub scriber database.

The configuration module 214 may generate the configuration interface 128 for subscribers to input unavailability notification messages that can be automatically delivered to the telephone numbers of callers. The configuration interface 128 may be a web portal that is implemented using various application program interfaces (APIs). In some embodiments, a subscriber may use a keyboard to input a text notification message into the configuration interface 128. In other embodiments, the configuration interface 128 may provide a data file upload feature that enables the subscriber to upload images and/or audio snippets. Such data files may be uploaded either as stand-alone unavailable notification messages or as supplemental content to other unavailable notification messages. In additional embodiments, the configuration interface 128 may enable the subscriber the use a microphone and/or a camera of the user device to provide a live stream of the audio or multimedia content. In turn, the various data inputted or provided by the subscriber via the configuration interface may be captured by a backend media recording service of configuration module 214 as unavailable notification messages. Additionally, the configuration interface may provide a calendar feature that enables the user to designate a specific time period (e.g., time, dates) during which the unavailable notification message will be sent to the telephone numbers of callers. The unavailability notification messages that are generated may include content such as texts, pictures, audio files, video files, virtual contact files, etc. An unavailability notification message may indicate that a subscriber is unable to respond to the incoming call, a reason for the unavailability (e.g., out-of-office, on vacation, at a conference, etc.), a date and time period for the unavailability, an alternative contact person, alternative contact information, and/or so forth. In some instances, the configuration interface may provide one or more custom data fields in which such information may be inputted by the subscriber.

In various embodiments, the configuration interface 128 may enable a subscriber to create different groups of callers by grouping the telephone numbers of callers. The grouping of callers may be performed by assigning the telephone numbers belonging to the caller devices of the callers into groups. The groups that are created by each subscriber may be stored in a corresponding address book of the subscriber in the user address database 132. The configuration interface 128 may also enable a subscriber to assign different types of unavailability notification messages having different message content to the different groups of callers. For example, a subscriber may create and assign a first type of unavailability notification message for callers that are listed in a specific directory of the user and create and assign a second type of unavailability notification message for callers that are not listed in the specific directory. In another example, groups of callers may be established based on whether the callers are listed in an internal corporate directory of a company. Thus, the subscriber may create and assign a first type of unavailability notification message for a first group of callers that are listed in the internal corporate directory, and further create and assign a second type of unavailability notification message for a second group of callers that are not listed in the internal corporate directory. In such an example, the first type of unavailability notification message may contain more detail than the second type of unavailablity notification. This is because the subscriber may have more trust in callers that are listed in the internal corporate directory. In some embodiments, the groups of callers may have telephone numbers with different characteristics, such as different country codes, different area codes, different number prefixes. For example, the subscriber may create and designate a first type of unavailability notification message for telephone numbers with a specific country code, area code, or number prefix, and create and designate a second type of unavailability notification message for telephone numbers with another specific country code, area code, or number prefix. However, in some instance, the TAS 122 may be configured to not send notification messages to certain country codes due to subscriber configured restrictions on international messaging. Alternatively, the TAS 122 may send a notification message to an international number and charge the subscriber the appropriate additional service fee via the billing function.

In other embodiments, the groups may include blacklisted telephone numbers or whitelisted telephone numbers. The blacklisted telephone numbers may be telephone numbers that the subscriber does not want to receive calls from, while the white-listed telephone numbers may be telephone numbers the subscriber has not blacklisted. Accordingly, different types of unavailability notification messages may be created for each group by the subscriber. In alternative embodiments, rather than creating different types of unavailability notification messages for these groups, the subscriber may simply use the configuration interface 128 to configure the TAS 122 to refrain from sending any unavailability notification messages to the blacklisted telephone numbers, i.e., only send unavailability notification messages to the whitelisted telephone numbers.

Other groups for which different types of unavailability notification messages with different message content may be created include family, friends, specific co-workers that are listed in an internal corporate directory, miscellaneous callers, and/or so forth. The configuration interface 128 may enable the subscriber to create such groups, modify members of such group, or delete such groups via manipulation of corresponding telephone numbers. The configuration interface 128 may further enable the subscriber to input, modify, and/or assemble local device-stored or network-stored telephone numbers into these groups for storage in the user profile database 134. Once the telephone numbers are grouped, the subscriber may create different unavailability notification messages for one or more of the groups. However, in other embodiments, the subscriber may decide to forego the use of groups. Instead, the subscriber may use the configuration interface to create customized unavailability notification messages for individual telephone numbers. Alternatively, the subscriber may simply use the configuration interface 128 to create and designate a default unavailability notification message to be routed back for all incoming calls or routed back for incoming calls from telephone numbers that do not belong to any particular group.

In some embodiments, the configuration interface 128 may enable a subscriber to create multiple forms of an unavailability notification message that convey the same unavailability information (e.g., identical unavailability dates and/or duration, alternative contact, unavailability reason, and/or so forth). The different forms may include RCS, MMS, SMS. In this way, the TAS 122 may fall back to the delivery of an alternative format of an unavailability notification message if the originating network of the caller is unable to send a particular format of the notification message from the wireless carrier network 104 to an originating caller device due to network incompatibility. In additional embodiments, the configuration interface 128 may enable a subscriber to designate, for a telephone number of a caller stored in the address book of the subscriber, an alternative telephone number for an alternative caller device of the caller to which an unavailability notification message is to be sent in response to an incoming call. For example, the telephone number stored in the address book of the subscriber may be a telephone number (e.g., a landline telephone number, an international telephone number, etc.) for which the caller is incapable of receiving unavailability notification messages. Accordingly, the TAS 122 may use the alternative telephone number to delivery an unavailability notification message to an alternative caller device of the caller.

The configuration interface 128 may further enable the subscriber to customize the notification settings under which the unavailability notification messages may be sent. The notification settings may determine whether or not an unavailability notification message is to be sent to a caller in combination with performing incoming call alerting, call forwarding, providing voicemail access, and/or other call handling tasks. For example, the subscriber may use the configuration interface 128 to designate that an unavailability notification message is to be sent to a caller following the forwarding of an incoming call from the caller to a different telephone number of the subscriber. The forwarding of the incoming call of the caller may be performed based upon the specific telephone number of the caller or a group to which the specific telephone number indicates the caller belongs. In another example, the subscriber may designate that incoming calls from a caller or a group of callers are not to be routed to voicemail, but that an unavailability notification message is to be sent to the caller or the group of callers instead. However, in alternative embodiments, the subscriber may designate that an unavailability notification message is to be sent to a caller or a group of callers despite routing the incoming calls from the caller or the group of callers to voicemail.

In some instances, the notification settings may be configured such that an unavailability notification message may be sent to the telephone number of a caller after the caller has terminated the call regardless of whether the caller has left a voicemail message for the subscriber. In other instances, the notification message may be sent to the telephone number of the caller when the caller terminates the call without having left a voicemail for the subscriber, or without having left a voicemail message for the subscriber that is of a predetermined time duration (e.g., two seconds, four seconds, etc.). The use of the predetermined time duration may prevent a delayed hang-up of the call that results in a recording of background noise or static from being treated as a valid voicemail message left by the caller. The configuration module 214 may store the notification settings that are inputted by each subscriber in the user profile database 134.

The notification module 216 may use the information stored in the user profile database 134 and/or the user address database 132 to select an appropriate unavailability notification message to send to an originating caller device in response to an incoming call from the device. In various embodiments, an incoming call from an originating caller device may trigger the notification module 216 to request a user profile of a subscriber from the user profile database 134. The request may be made using a telephone number associated with a terminating user device for the incoming call, in which the terminating user device is assigned to the subscriber. The user profile for the subscriber may contain the unavailability notification settings that the subscriber has configured for the delivery of unavailability notification messages, as well as other user profile information. The notification module 216 may analyze the notification settings to determine whether an unavailability notification message is to be delivered to the originating caller device. In some instances, no unavailability notification message may be delivered because a current date and time are outside of the active delivery date and time range specified by the notification settings. In other instances, no unavailability notification message may be delivered because the incoming call was routed by the TAS 122 to a voicemail account of the recipient subscriber and/or the originating caller of the incoming call left a voicemail message of sufficient length in the voicemail inbox of the recipient subscriber. Accordingly, if no unavailability notification message is to be delivered, the notification module 216 may permit the TAS 122 to route the incoming call to the terminating user device. Otherwise, the notification module 216 may direct a messaging service of the TAS 122 to send an unavailability notification message to the originating caller device based on the notification settings.

In some instances, if the notification settings indicate that a type of the unavailability notification message to be delivered to the originating caller device is based on the telephone number of the particular caller, the notification module 216 may check the user address database 132 to determine whether the telephone number of the incoming call indicates that a particular caller who initiated the incoming call belongs to a group that has an assigned customized unavailability notification message. Thus, if the user address database 132 indicates that the particular caller belongs to a group that has assigned an unavailability notification message, the notification module 216 may select the appropriate unavailability notification message that corresponds to an originating caller device of the particular caller from a message data store of the TAS 122 for delivery to the originating caller device.

In other instances, if the information in the user address database 132 indicates that the particular caller does not belong to any group and no customized notification message is configured, the notification module 216 may select a default unavailability notification message for delivery to an originating caller device of the particular caller or send no notification message to the originating caller device of the particular caller. Further, if the notification settings in the user profile database 134 indicate that the type of unavailability notification message to be delivered is not based on the telephone number of the caller, the notification module 216 may direct the messaging service to send a default unavailability notification message to the originating caller device.

In various embodiments, the unavailability notification message may include a text message, a picture, an audio file, a video file, a virtual contact file, and/or so forth. In some embodiments, the messaging service may receive an indication from an originating network that the originating network is unable to deliver a designated unavailability message in a particular format (e.g., RCS) to an originating caller device of an incoming call. This may be a result of network incompatibility between the two networks. Accordingly, the messaging service may notify the notification module 216. In turn, the notification module 216 may direct the messaging service to send a comparable message in a compatible format (e.g., SMS), as set up by the subscriber, to the originating network.

The billing module 218 may trigger the billing function of the wireless carrier network 104 to bill each subscriber for the automated unavailability notification service. The billing may be performed on a per-notification delivery basis, such that subscriber is billed a set fee for each notification. Other billing arrangements may include billing a set fee for each multiple (e.g., five, ten, etc.) notifications. Volume-based escalated billing or discounted billing may also be performed, such that the fee per each notification may increase or decrease based on the volume of notifications that are delivered in a predetermined time period. Other billing arrangements for a subscriber may include a recurring flat fee (e.g., weekly fee, monthly fee, etc.), a one-time fee, and/or so forth. However, in other instances, the automated unavailability notification service may be offered by the wireless carrier network 104 to subscribers as one of the multiple services in a bundle of paid services.

Example Protocol Flow

Figure 3:
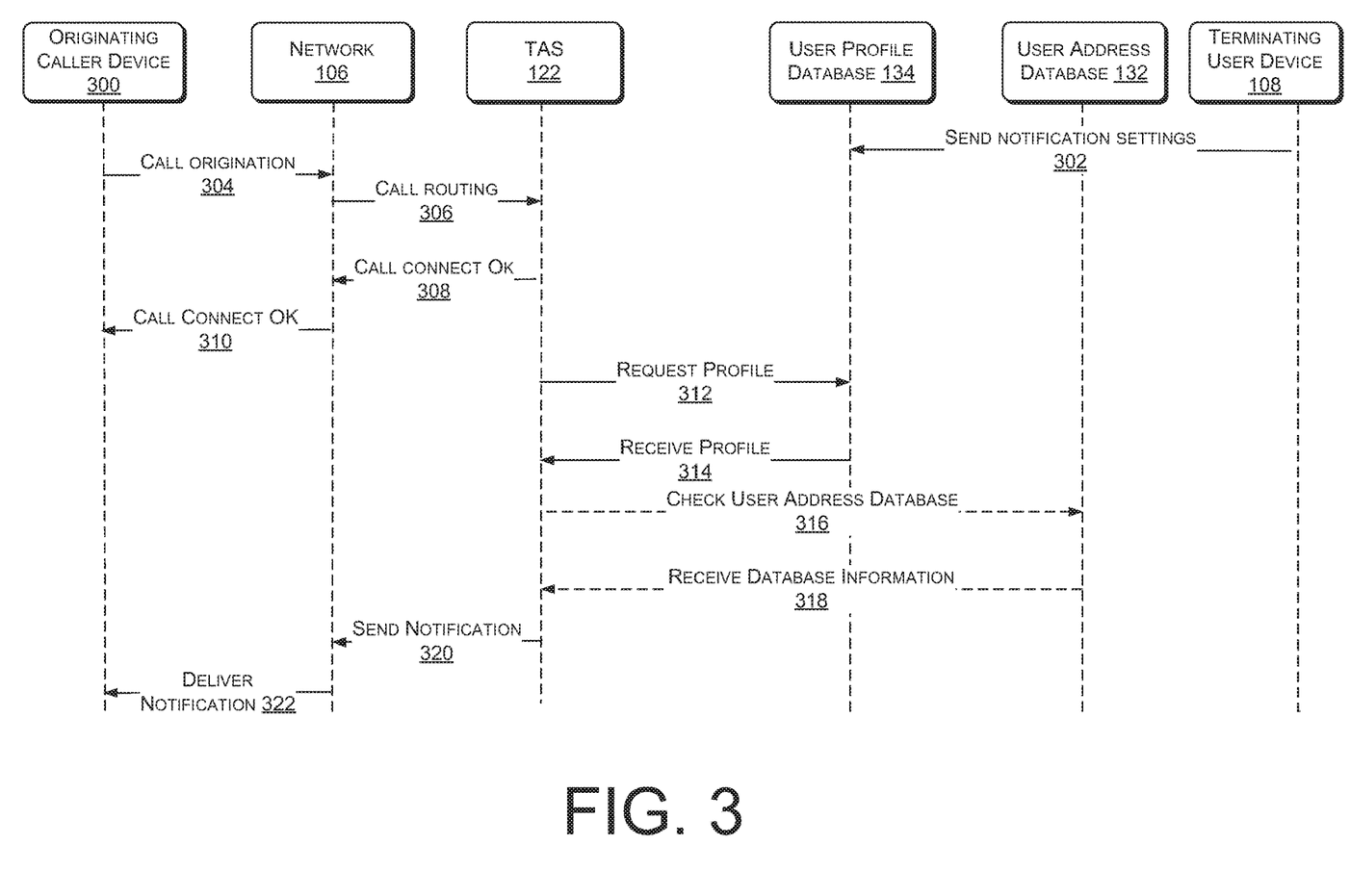
FIG. 3 is a diagram that shows an example protocol flow for implementing automated unavailability response for call handling.

FIG. 3 is a diagram that shows an example protocol flow for implementing automated unavailability response for call handling. The example protocol is illustrated with respect to an incoming call that is initiated from an originating caller device 300 to the terminating user device 108. At 302, a terminating user device 108 of the subscriber 124 may send notification settings for the delivery of unavailability notification messages to the user profile database 134 of the wireless carrier network 104. The user profile database 134 may be maintained by the core network 110 of the wireless carrier network 104. In various embodiments, the subscriber 124 may use a configuration interface 128 to configure and deliver the notification settings to the wireless carrier network 104 for storage in the user profile database 134.

At 304, the originating caller device 300 may initiate a call to an originating network, such as the network 106. The call may be initiated by a particular caller at the originating caller device 300 for routing to the terminating user device 108 of the subscriber 124. The call may be identified by caller information that includes a telephone number of the originating caller device 300, a caller identifier of the particular caller, a device identifier of the originating caller device 300, and/or so forth.

At 306, the network 106 may route the call to the core network 110 of the wireless carrier network 104. The incoming call request may arrive at the P-CSCF 116 of the core network 110 and is routed to the TAS 122. At 308, the TAS 122 may respond to the incoming call request by sending a call connection acknowledgment to the network 106. At 310, the network 106 may report the call connection acknowledgment to the originating caller device 300 to complete the connection of the call between originating caller device 300 and the core network 110 of the wireless carrier network 104. For example, the TAS 122 may establish a SIP session for the originating caller device 300 and the terminating user device 108.

At 312, the TAS 122 of the core network 110 may request a user profile for the subscriber 124 from the profile database. The request may be made using a telephone number associated with the terminating user device 108 of the subscriber 124. The user profile may contain the notification settings that the subscriber 124 has configured for the delivery of unavailability notification messages. At 314, the user profile is retrieved from the profile database for use by the TAS 122.

Accordingly, if the notification settings indicate that the type of unavailability notification message to be delivered to the originating caller device 300 is based on the telephone number of the originating caller device, the TAS 122 may optionally check the user address database 132 to determine whether the telephone number indicates that the particular caller associated with the originating caller device belongs to a group that has an assigned customized message at 316. Also, optionally at 318, information regarding the group that the particular telephone number is a member of or information regarding the customized unavailability notification message is received by the TAS 122 from the user address database 132. Accordingly, the TAS 122 may select the appropriate unavailability notification message that corresponds to the telephone number of the originating caller device 300 from the data store for delivery to the originating caller device 300. In some instances, if the information in the user address database indicates that the telephone number of the originating caller device 300 does not belong to any group and no customized notification message is configured, the TAS 122 may select a default unavailability notification message for delivery to the originating caller device 300 or send no notification message to the originating caller device 300. Further, if the notification settings in the profile database indicate that the type of unavailability notification message to be delivered is not based on the telephone number, operations 316 and 318 may be skipped. Instead, the TAS 122 may send a default unavailability notification message.

At 320, the TAS 122 may use a messaging service of the core network 110 to send the designated unavailability notification message to the network 106 for routing to the originating caller device 300. In various embodiments, the message may include text, a picture, an audio file, a video file, a virtual contact file, and/or so forth. In some embodiments, if the TAS 122 is unable to send a designated unavailability message in a particular format (e.g., RCS) to the originating caller device 300 due to network incompatibility between the two networks, the TAS 122 may instead send a comparable message in a compatible format (e.g., SMS), as set up by the subscriber 124, to the network 106. At 322, the network 106 may deliver the unavailability notification message to the originating caller device 300 via the telephone number of the originating caller device 300. In various embodiments, the example protocol flow does not necessarily prevent the TAS 122 from performing other functions with respect to the incoming call, such as incoming call alerting at the terminating user device 108, call forwarding or sending the call to a voicemail of the subscriber 124 in a concurrent or sequential manner.

Example Processes

Figure 4:
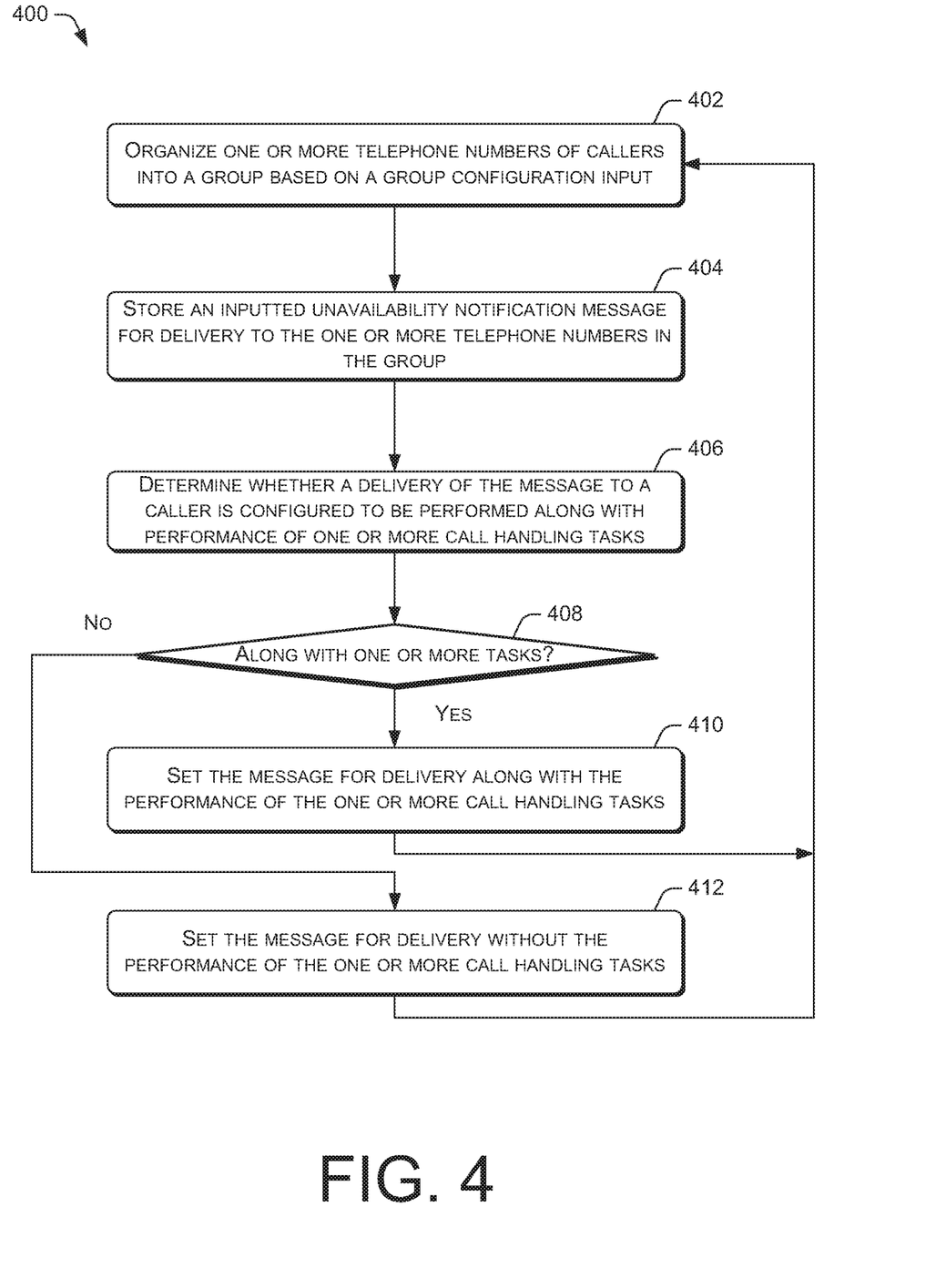
FIG. 4 is a flow diagram of an example process for configuring an unavailability notification message for delivery to an originating caller device that initiated an incoming call.
Figure 5:
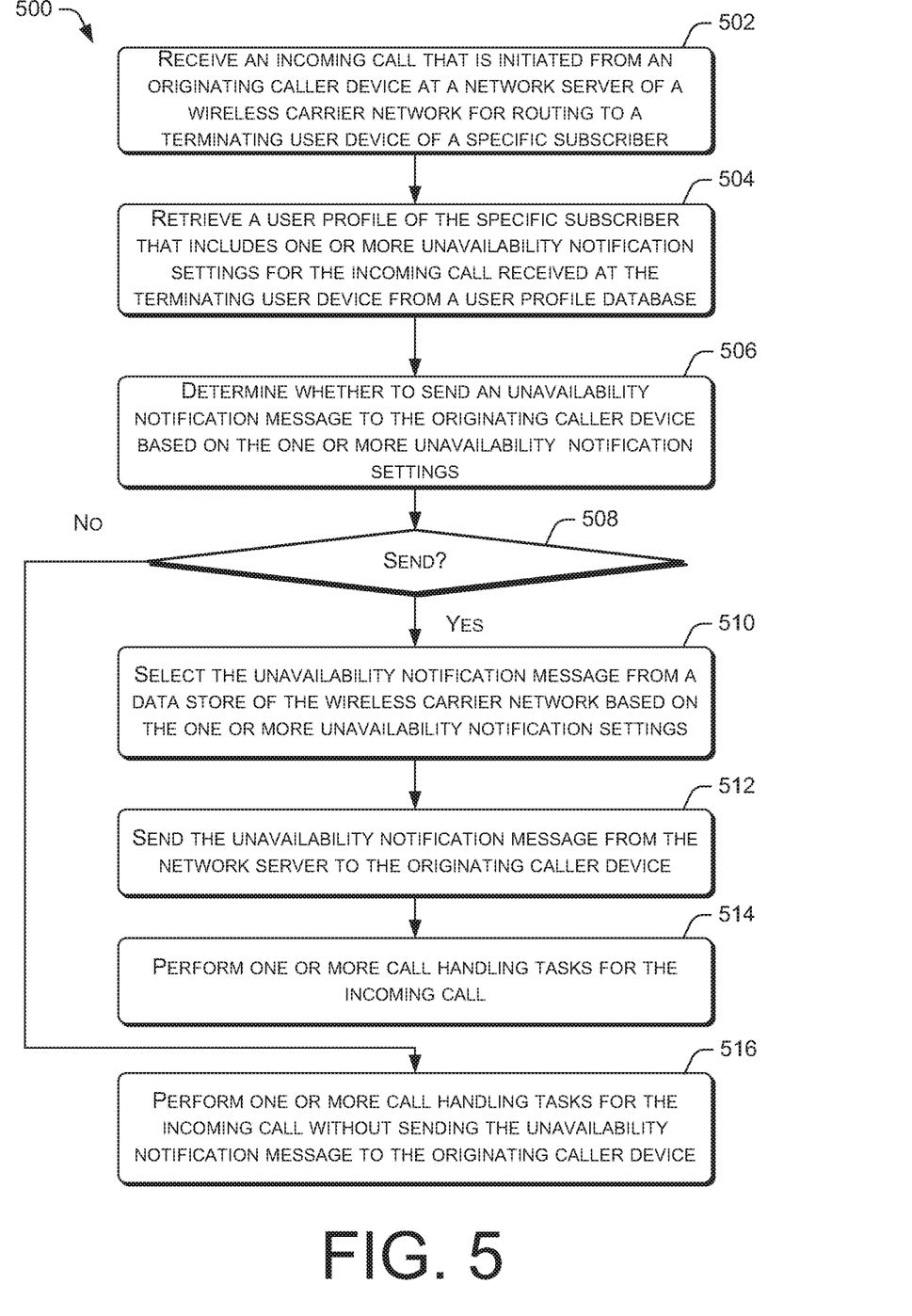
FIG. 5 is a flow diagram of an example process for sending an unavailability notification message to an originating caller device that initiated an incoming call.
Figure 6:
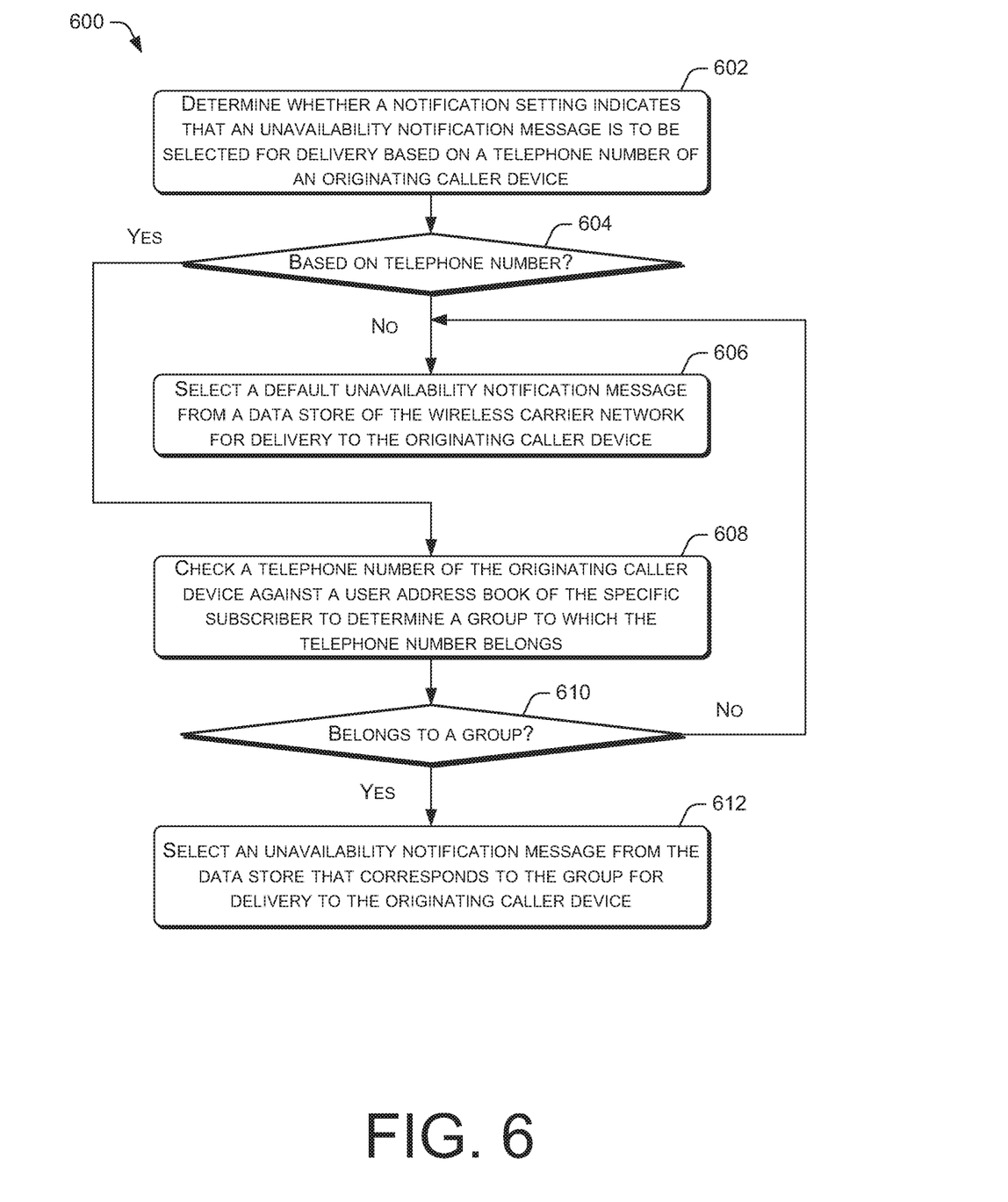
FIG. 6 is a flow diagram of an example process for selecting an unavailability notification message from a data store for delivery to an originating caller device that initiated an incoming call.

FIGS. 4-6 present illustrative processes 400-600 for implementing automated unavailability response for call handling. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the network architecture 100 of FIG. 1.

FIG. 4 is a flow diagram of an example process 400 for configuring an unavailability notification message for delivery to an originating caller device that initiated an incoming call. At block 402, a network server may organize one or more telephone numbers of callers into a group based on a group configuration input. In various embodiments, the network server may be the TAS 122 of the wireless carrier network 104. The TAS 122 may provide a configuration interface 128 that enables a subscriber to group the callers by assigning the telephone numbers of the callers into one or more groups. For example, the callers may be grouped into family, friends, specific co-workers that are listed in an internal corporate directory, miscellaneous callers, and/or so forth. The telephone number of a caller is a telephone number used by an originating caller device of the caller to initiate incoming calls to the wireless carrier network.

At block 404, the network server may store an inputted unavailability notification message for delivery to the one or more telephone numbers in the group. The delivery of the unavailability notification message to a telephone number means that the message is routed to an associated caller device that uses the telephone phone for telecommunication. In some embodiments, a subscriber may use a keyboard to input a text notification message into the configuration interface 128. In other embodiments, the configuration interface 128 may provide a data file upload feature that enables the subscriber to upload images and/or audio snippets. In additional embodiments, the configuration interface 128 may enable the subscriber the use a microphone and/or a camera of the user device to provide a live stream of the audio or multimedia content.

At block 406, the network server may determine whether a delivery of the unavailability notification message to a caller is configured to be performed along with the performance of one or more other call handling tasks. In various embodiments, the network server may make such a determination based on one or more notification settings that are inputted by the subscriber via the configuration interface 128. For example, the notification settings may determine whether or not the unavailability notification message is to be sent to a caller in combination with performing incoming call alerting, call forwarding, providing voicemail access, and/or other call handling tasks.

At decision block 408, if the network server determines that the delivery of the unavailability notification message is to be performed along with one or more other tasks ("yes" at decision block 408), the process 400 may proceed to block 410. At block 410, the network server may set the unavailability notification message for delivery along with the performance of the one or more call handling tasks. In some embodiments, the process 400 may subsequently loop back to block 402, so that additional telephone numbers may be organized into one or more groups. Returning to decision block 408, if the network server determines that the delivery of the unavailability notification message is to be performed independent of the one or more other tasks ("no" at decision block 408), the process 400 may proceed to block 412. At block 412, the network server may set the unavailability notification message for delivery without the performance of the one or more call handling tasks. In some embodiments, the process 400 may subsequently loop back to block 402, so that additional telephone numbers may be organized into one or more groups.

FIG. 5 is a flow diagram of an example process 500 for sending an unavailability notification message to an originating caller device that initiated an incoming call. At block 502, a network server of a wireless carrier network may receive an incoming call that is initiated from an originating caller device for routing to a terminating user device of a specific subscriber. The incoming call may be identified by a telephone number that is used by the originating caller device to initiate the incoming call to the wireless carrier network 104. In various embodiments, the network server may be the TAS 122 of the wireless carrier network 104. The incoming call may be routed to the TAS 122 by the network 106. The network 106 may be a third-party wireless carrier network, a radio access network of the wireless carrier network 104, a local area network (LAN), a wide area network (WAN), a collection of networks (e.g., the Internet), and/or a combination that includes one or more of these networks.

At block 504, the network server may retrieve a user profile of the specific subscriber that includes one or more unavailability notification settings for the incoming call received at the terminating user device from a user profile database of the wireless carrier network. The unavailability notification settings may specify a particular unavailability notification message for the incoming call, the time and date range during which the unavailability notification messages may be delivered in response to the incoming call, whether or not the unavailability notification message is to be sent to a caller in combination with other call handling tasks, and/or so forth.

At block 506, the network server may determine whether to send an unavailability notification message to the originating caller device based on the one or more unavailability notification settings. For example, the unavailability notification settings may specify a time and date range during which one or more specific unavailability notification messages may be delivered to the originating caller device in response to incoming calls. Accordingly, the network server may not deliver an unavailability notification message to the originating caller device outside of the time and date range. At decision block 508, if the network server determines that an unavailability notification message is to be sent ("yes" at decision block 508), the process 500 may proceed to block 510.

At block 510, the network server may select an unavailability notification message from a data store of the wireless carrier network based on the one or more unavailability notification settings. The data store may be a message data store that is accessible to the TAS 122. In some embodiments, the unavailability notification message may be selected based on the telephone number that identifies the incoming call. At block 512, the network server may send the unavailability notification message from the network server to the originating caller device. The unavailability notification message may be sent to the originating caller device via the network 106. At block 514, depending on configuration settings set by the specific subscriber, the sending of the unavailability notification message as performed in block 512 may be performed in combination with one or more other call handling tasks for the incoming call, such as incoming call alerting, call forwarding, providing voicemail access, and/or so forth.

Returning to decision block 508, if the network server determines that an unavailability notification message is not to be sent ("no" at decision block 508), the process 500 may proceed to block 516. At block 516, the network server may perform one or more call handling tasks for the incoming call without sending the unavailability notification message to the originating caller user device.

FIG. 6 is a flow diagram of an example process 600 for selecting an unavailability notification message from a data store for delivery to an originating caller device that initiated an incoming call. The example process 600 further describes block 506 of the process 500. At block 602, the network server may determine whether a notification setting in the user profile indicates that an unavailability notification message is to be selected for delivery based on a telephone number of an originating caller device. The telephone number is used by the originating caller device to initiate the incoming call to the wireless carrier network 104. In various embodiments, the network server may be the TAS 122 of the wireless carrier network 104. At decision block 604, if the notification setting indicates that the unavailability notification message is not to be selected for delivery based on the telephone number, i.e., selected without the use of the telephone number ("no" at decision block 604), the process 600 may proceed to block 606. At block 606, the network server may select a default unavailability notification message from a data store of the wireless carrier network for delivery to the originating caller device.

However, if the notification setting indicates that the unavailability notification message is to be selected for delivery based on the telephone number of the originating caller device ("yes" at decision block 604), the process 600 may proceed to block 608. At block 608, the network server may check a telephone number of the originating caller device against an address book of the specific subscriber to determine a group to which the telephone number belongs. In various embodiments, the address book of the specific subscriber may be stored in a user address database 132 that is accessible to the TAS 122. The address book of the specific subscriber may contain one or more groups of callers, in which the callers are assigned to the groups based on the telephone numbers of corresponding caller devices.

At decision block 610, the network server may determine whether the telephone number belongs to a group. Accordingly, if the network server determines that the telephone number does not belong to any group ("no" at decision block 610), the process 600 may loop back to block 606, so that the network server may once again select a default unavailability notification message for delivery. However, if the network server determines that the telephone number does belong to a group in the address book, the process 600 may proceed to block 612. At block 612, the network server may select an unavailable notification message from the data store that corresponds to the group for delivery to the originating caller device.

The use of automatic unavailability notification may enable a subscriber of a wireless carrier network to set up the delivery of unavailability notification messages in a centralized manner at a network server, instead of on a device-by-device basis. Further, the unavailability notification messages may inform the callers of the long-term unavailability of the subscriber even when callers do not listen or pay attention to the voicemail greeting of the subscriber that makes the same notification. Such messages may prevent repeated callbacks by callers when the subscriber does not intend to answer calls for an extended period of time. This may reduce the total amount of call volume experienced by a wireless carrier network and decrease the use of network and communication resources.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a network server storing computer-executable instructions that upon execution cause one or more processors to perform acts comprising:

receiving an incoming call that is initiated from an originating caller device at the network server for routing to a terminating user device of a specific subscriber, the incoming call including a telephone number that identifies the incoming call;

retrieving a user profile of the specific subscriber that includes one or more unavailability notification settings for the incoming call from a user profile database;

selecting from a data store, an unavailability notification message that is customized for the telephone number of the incoming call according to a country code of the telephone number based at least on the one or more unavailable notification settings;

in response to determining that the country code of the telephone number is absent from a plurality of multiple country codes configured by the specific subscriber as messaging restricted, sending the unavailability notification message from the network server to the telephone number of the originating caller device via a messaging service; and in response to determining that the country code of the telephone number is one of the plurality of multiple country codes configured by the specific subscriber as messaging restricted, restricting the unavailability notification message from being sent to the telephone number of the originating caller device.

2. The one or more non-transitory computer-readable media of claim 1, wherein the acts further comprise:

organizing one or more telephone numbers of callers into a group based on a group configuration input; and storing an inputted unavailability notification message for delivery to a corresponding caller device associated with each of the one or more telephone numbers in the group.

3. The one or more non-transitory computer-readable media of claim 1, wherein the network server is a telephony application server (TAS) of a wireless carrier network.

4. The one or more non-transitory computer-readable media of claim 3, wherein the incoming call is routed to the TAS of the wireless carrier network via an additional wireless carrier network or a radio access network of the wireless carrier network, and wherein the sending includes sending the unavailability notification message to the originating caller device via the additional wireless carrier network or the radio access network.

5. The one or more non-transitory computer-readable media of claim 1, wherein the acts further comprise:

checking an additional telephone number of an additional incoming call against an address book of the specific subscriber to determine a group to which the additional telephone number belongs, the additional telephone number used by an additional originating caller device to initiate the incoming call;

in response to determining that the additional telephone number belongs to a particular group in the address book, selecting an additional unavailability notification message that corresponds to the particular group for delivery to the additional originating caller device; and in response to determining that the additional telephone number does not belong to any group in the address book, selecting a default unavailability notification message for delivery to the additional originating caller device.

6. The one or more non-transitory computer-readable media of claim 5, wherein the acts further comprise moving the additional telephone number from the particular group to a different group based on an input received from the specific subscriber at a configuration interface.

7. The one or more non-transitory computer-readable media of claim 1, wherein the acts further comprise:
   receiving an additional incoming call that is initiated from an additional originating caller device at the network server for routing to the terminating user device of a specific subscriber, the additional incoming call includes an additional telephone number that identifies the additional incoming call; and
   in response to determining that the additional telephone number includes a specific country code, refraining from sending any unavailability notification message to the additional originating caller device.

8. The one or more non-transitory computer-readable media of claim 1, wherein the unavailability notification message includes at least one of text, a picture, an audio file, a video file, or a virtual contact file.

9. The one or more non-transitory computer-readable media of claim 1, wherein the sending the unavailability notification message is performed in combination with one or more additional call handling tasks that include incoming call alerting, call forwarding, or providing voicemail access.

10. The one or more non-transitory computer-readable media of claim 1, wherein the unavailability notification message indicates at least one of a time period that the specific subscriber is unavailable to receive calls, a reason for an unavailability of the specific subscriber, an alternative contact person, or contact information of the alternative contact person.

11. The one or more non-transitory computer-readable media of claim 1, wherein the unavailability notification message is in at least one of a short message service (SMS) message format, a multimedia messaging service (MMS) message format, or a rich communication service (RCS) message format.

12. A computer-implemented method, comprising:
   receiving, at a network server of a wireless carrier network, an incoming call that is initiated from an originating caller device for routing to a terminating user device of a specific subscriber;
   routing the incoming call from the originating caller device to a voicemail inbox of the specific subscriber;
   retrieving, via the network server, a user profile of the specific subscriber that includes one or more unavailability notification settings for the incoming call from a user profile database;
   selecting, via the network server, an unavailability notification message from a data store based at least on the one or more unavailable notification settings; and
   in response to a caller of the originating caller device leaving a voicemail message for the specific subscriber that is less than a predetermined time duration in the voicemail inbox of the specific subscriber before terminating the incoming call, sending, via the network server, the unavailability notification message to a telephone number of the originating caller device via a messaging service.

13. The computer-implemented method of claim 12, wherein the incoming call is routed to the wireless carrier network via an originating wireless carrier network, and wherein the sending includes sending the unavailability notification message to the originating caller device via the originating wireless carrier network.

14. The computer-implemented method of claim 13, wherein the unavailability notification message is in a first format, further comprising:
   receiving, at the network server, an indication that the originating wireless carrier network is unable to deliver the unavailability notification message in the first format to the originating caller device; and
   sending, via the network server, a second format of the unavailability notification message to the originating caller device via the originating wireless carrier network.

15. The computer-implemented method of claim 13, wherein the selecting includes:
   checking a telephone number against an address book of the specific subscriber to determine a group to which the telephone number belongs, the telephone number used by the originating caller device to initiate the incoming call;
   in response to determining that the telephone number belongs to a particular group in the address book, selecting an unavailability notification message that corresponds to the particular group for delivery to the originating caller device; and
   in response to determining that the telephone number does not belong to any group in the address book, selecting a default unavailability notification message for delivery to the originating caller device.

16. The computer-implemented method of claim 12, wherein the unavailability notification message includes at least one of text, a picture, an audio file, a video file, or a virtual contact file.

17. The computer-implemented method of claim 12, wherein the network server is a telephony application server (TAS) of the wireless carrier network.

18. A server, comprising:
   one or more processors; and
   memory having instructions stored therein, the instructions, when executed by the one or more processors, cause the one or more processors to perform acts comprising:
      receiving an incoming call that is initiated from an originating caller device at a network server for routing to a terminating user device of a specific subscriber;
      routing the incoming call from the originating caller device to a voicemail inbox of the specific subscriber;
      checking a telephone number that is used by the originating caller device to initiate the incoming call against an address book of the specific subscriber to determine a group to which the telephone number belongs;
      in response to determining that the telephone number belongs to a particular group in the address book, selecting an unavailability notification message that corresponds to the particular group in the address book; and
      in response to a caller of the originating caller device leaving a voicemail message for the specific subscriber that is less than a predetermined time duration in the voicemail inbox of the specific subscriber before terminating the incoming call, sending the unavailability notification message that corresponds to the particular group to the originating caller device via a messaging service.

19. The server of claim 18, wherein the acts further comprise:
   organizing one or more telephone numbers of callers into a first group or a second group based on a group configuration input; and storing an inputted unavailability notification message for delivery to a corresponding caller device associated with each of the one or more telephone numbers in the first group or the second group.

20. The server of claim 18, wherein sending the unavailability notification message is in at least one of a short message service (SMS) message format, a multimedia messaging service (MMS) message format, or a rich communication service (RCS) message format.

* * * * *